United States Patent
Lee et al.

(10) Patent No.: US 10,269,505 B2
(45) Date of Patent: Apr. 23, 2019

(54) MULTI-LAYERED GRAPHENE FILMS, ENERGY STORAGE DEVICES USING MULTI-LAYERED GRAPHENE FILMS AS ELECTRODES, AND METHODS OF MANUFACTURING MULTI-LAYERED GRAPHENE FILMS AND ENERGY STORAGE DEVICES

(71) Applicants: Samsung Electronics Co., Ltd., Suwon-si, Gyeonggi-do (KR); Corning Precision Materials Co., Ltd., Asan-si, Chungcheongnam-do (KR)

(72) Inventors: Dong-wook Lee, Suwon-si (KR); Soon-geun Kwon, Asan-si (KR)

(73) Assignees: Samsung Electronics Co., Ltd., Gyeonggi-do (KR); Corning Precision Materials Co., Ltd., Chungcheongnam-do (KR)

( * ) Notice: Subject to any disclaimer, the term of this patent is extended or adjusted under 35 U.S.C. 154(b) by 0 days.

(21) Appl. No.: 15/913,216

(22) Filed: Mar. 6, 2018

(65) Prior Publication Data

US 2018/0197690 A1     Jul. 12, 2018

Related U.S. Application Data

(62) Division of application No. 14/325,723, filed on Jul. 8, 2014, now abandoned.

(30) Foreign Application Priority Data

Jul. 8, 2013 (KR) .................. 10-2013-0079898
Jul. 4, 2014 (KR) .................. 10-2014-0083763

(51) Int. Cl.
*H01G 11/36* (2013.01)
*B32B 38/00* (2006.01)
(Continued)

(52) U.S. Cl.
CPC ............. *H01G 11/26* (2013.01); *B32B 37/02* (2013.01); *H01G 11/32* (2013.01); *H01G 11/86* (2013.01);
(Continued)

(58) Field of Classification Search
CPC ........ H01G 11/26; H01G 11/32; H01G 11/86; B32B 37/02; B32B 2310/0831;
(Continued)

(56) References Cited

U.S. PATENT DOCUMENTS

2009/0040690 A1   2/2009   Yasuda
2010/0035093 A1   2/2010   Ruoff et al.
(Continued)

FOREIGN PATENT DOCUMENTS

JP   2011/105583 A   6/2011
JP   2012/216515 A   11/2012
(Continued)

OTHER PUBLICATIONS

Fan, Zhuangjun, et al., "A Three-Dimensional Carbon Nanotube/Graphene Sandwich and Its Application as Electrode in Supercapacitors," Advanced Materials, vol. 22, 2010, pp. 3723-3728.
(Continued)

*Primary Examiner* — Seahvosh Nikmanesh
(74) *Attorney, Agent, or Firm* — Harness, Dickey & Pierce, P.L.C.

(57) ABSTRACT

Provided are a multi-layered graphene film, a method of manufacturing the multi-layered graphene film, and an energy storage device using the multi-layered graphene film as an electrode. The multi-layered graphene film includes a first graphene layer, a spacer layer provided on the first graphene layer, and an upper graphene layer provided on the spacer layer. The spacer layer is provided to maintain a desired distance between the first graphene layer and the (Continued)

upper graphene layer. A plurality of layers with different layer configurations are further provided between the spacer layer and the upper graphene layer. The spacer layer may a graphene or a graphene oxide layer.

17 Claims, 16 Drawing Sheets

(51) Int. Cl.
- B32B 37/24 (2006.01)
- B32B 37/00 (2006.01)
- H01G 11/26 (2013.01)
- B32B 37/02 (2006.01)
- H01G 11/32 (2013.01)
- H01G 11/86 (2013.01)

(52) U.S. Cl.
CPC ... *B32B 2310/0831* (2013.01); *B32B 2457/20* (2013.01); *Y02E 60/13* (2013.01); *Y10T 29/417* (2015.01); *Y10T 428/24851* (2015.01); *Y10T 428/30* (2015.01)

(58) Field of Classification Search
CPC ........... B32B 457/20; Y10T 428/24851; Y10T 428/30; Y10T 29/417
See application file for complete search history.

(56) References Cited

U.S. PATENT DOCUMENTS

| | | |
|---|---|---|
| 2010/0307900 A1 | 12/2010 | Choi et al. |
| 2011/0300063 A1 | 12/2011 | Phillips, III et al. |
| 2012/0021224 A1 | 1/2012 | Everett et al. |
| 2012/0134072 A1 | 5/2012 | Bae et al. |
| 2012/0267041 A1 | 10/2012 | Woo et al. |
| 2012/0328951 A1 | 12/2012 | Hirohashi et al. |
| 2012/0328956 A1 | 12/2012 | Oguni et al. |
| 2013/0000961 A1 | 1/2013 | Strachan et al. |
| 2013/0182373 A1 | 7/2013 | Yu et al. |
| 2013/0295374 A1 | 11/2013 | Tang et al. |
| 2014/0030590 A1 | 1/2014 | Wang et al. |
| 2014/0045058 A1 | 2/2014 | Zhao et al. |
| 2014/0098461 A1 | 4/2014 | Zhamu et al. |
| 2014/0118883 A1 | 5/2014 | Xie |
| 2015/0299852 A1 | 10/2015 | Ozkan et al. |

FOREIGN PATENT DOCUMENTS

| | | |
|---|---|---|
| KR | 2012/0105380 A | 9/2012 |
| WO | WO-2012/073998 A1 | 6/2012 |
| WO | WO-2012/138302 A1 | 10/2012 |

OTHER PUBLICATIONS

Korean Office Action dated Oct. 20, 2016 for corresponding Korean Patent Application No. 10-2014-0083763 and English translation thereof.

Wang, Yan et al., "Supercapacitor Devices Based on Graphene Materials," J. Phys. Chem. C, American Chemical Society, vol. 113, 2009, pp. 13103-13107.

Elshurafa et al., Mocroscale electrostatic fractional capacitors using reduced graphene oxide percolated polymer composites, Jun. 10, 2013, Applied Physics Letters, 102, 232901.

Liu, et al. Graphene-based thin film supercapacitor with graphene oxide as dielectric spacer, Aug. 9, 2013, Applied Physics Letters, 103, 063108.

Wang et al., Preventing Graphene Sheets from Restacking for High-Capacitance Performance, Oct. 13, 2011, The Journal of Physical Chemistry, 115, pp. 23192-23197.

MULTI-LAYERED GRAPHENE FILMS, ENERGY STORAGE DEVICES USING MULTI-LAYERED GRAPHENE FILMS AS ELECTRODES, AND METHODS OF MANUFACTURING MULTI-LAYERED GRAPHENE FILMS AND ENERGY STORAGE DEVICES

CROSS-REFERENCE TO RELATED APPLICATIONS

This is a divisional application of U.S. application Ser. No. 14/325,723, filed Jul. 8, 2014, which claims priority from Korean Patent Application No. 10-2013-0079898, filed on Jul. 8, 2013, in the Korean Intellectual Property Office, and Korean Patent Application No. 2014-0083763, filed on Jul. 4, 2014, in the Korean Intellectual Property Office, the disclosures of the two priority applications are incorporated herein in their entirety by reference.

BACKGROUND

1. Field

At least one example embodiment of the present disclosure relates to multi-layered graphene films and application thereof, and more particularly, to multi-layered graphene films, energy storage devices using multi-layered graphene films as electrodes, and methods of manufacturing multi-layered graphene films and energy storage devices.

2. Description of the Related Art

Indium tin oxide (ITO) is a typical transparent electrode material. ITO is more expensive than other transparent electrode materials. Reserves of indium, which is one of the main components of the ITO, are very restricted, compared to other materials.

Accordingly, interest in substitute materials replacing the ITO is increasing. Graphene is attracting attention as an example of the substitute materials, and extensive research into it is being conducted.

The graphene is a single hexagonal carbon layer. The graphene has high transparency (90% or more) and high electrical conductivity. Unlike an ITO film, a graphene film is flexible. Therefore, the graphene is also attracting attention as a next-generation flexible display material (e.g., an electrode). The graphene may also be used as an electrode of a battery or an electrode of a supercapacitor.

SUMMARY

Provided are multi-layered graphene films that may be used as electrodes that may increase energy storage capacity, according to various example embodiments.

Provided are methods of manufacturing multi-layered graphene films, according to various example embodiments.

Provided are energy storage devices using multi-layered graphene films as electrodes, according to various example embodiments.

Provided are methods of manufacturing energy storage devices, according to various example embodiments.

Additional example embodiments will be set forth in part in the description which follows and, in part, will be apparent from the description, or may be learned by practice of the presented example embodiments.

According to another example embodiment, a multi-layered graphene film includes: a first graphene layer; a spacer layer provided on the first graphene layer; and an upper graphene layer provided on the spacer layer, wherein the spacer layer is provided to maintain a desired (or, alternatively, predetermined) distance between the first graphene layer and the upper graphene layer.

A plurality of layers with different layer configurations may be further provided between the spacer layer and the upper graphene layer, according to various example embodiments.

The first graphene layer may be formed on a metal film, according to various example embodiments.

The plurality of layers with different layer configurations may be formed by stacking the first graphene layer and the spacer layer alternately at least one time, according to various example embodiments.

The spacer layer may include a second graphene layer, and the second graphene layer may have a different layer configuration than the first graphene layer and the upper graphene layer, according to various example embodiments.

The spacer layer may be graphene oxide layer, according to various example embodiments.

The second graphene layer may include a plurality of graphene sheet fragments that are spaced apart from each other, and the first graphene layer may include at least one graphene sheet that has a larger area than a total area of the plurality of graphene sheet fragments, according to various example embodiments.

According to another example embodiment, a method of manufacturing a multi-layered graphene film includes: forming a first graphene layer on a substrate; forming a spacer layer on the first graphene layer; and forming an upper graphene layer on the spacer layer, wherein the spacer layer is formed to maintain a desired (or, alternatively, predetermined) distance between the first graphene layer and the upper graphene layer.

A plurality of layers with different layer configurations may be further formed between the spacer layer and the upper graphene layer, according to various example embodiments.

The plurality of layers with different layer configurations may be formed by sequentially stacking the first graphene layer and the spacer layer alternately at least one time, according to various example embodiments.

The spacer layer may include a second graphene layer, and the second graphene layer may have a different layer configuration than the first graphene layer and the upper graphene layer, according to various example embodiments.

The spacer layer may be graphene oxide layer, according to various example embodiments.

The second graphene layer may include a plurality of graphene sheet fragments that are spaced apart from each other, and the first graphene layer may include at least one graphene sheet that has a larger area than a total area of the plurality of graphene sheet fragments, according to various example embodiments.

In at least one example embodiment, the forming of the first graphene layer on the substrate may include: forming a first graphene sheet on a first temporary substrate; attaching a first stamper to the first graphene sheet; removing the first temporary substrate; attaching the first graphene sheet, to which the first stamper is attached, on the substrate; and removing the first stamper.

In at least one example embodiment, the forming of the spacer layer on the first graphene layer may include: forming a plurality of graphene sheet fragments on a second temporary substrate; attaching a second stamper to the plurality of graphene sheet fragments; removing the second temporary substrate; attaching the plurality of graphene sheet fragments, to which the second stamper is attached, to the first graphene layer; and removing the second stamper.

In at least one example embodiment, the plurality of graphene sheet fragments may be formed with a shorter graphene growth time than the first graphene layer.

In at least one example embodiment, the first and second temporary substrates may be metal substrates.

In at least one example embodiment, the forming of the spacer layer on the first graphene layer may include: forming a graphene layer on a temporary substrate; changing the graphene layer, formed on the temporary substrate, into a graphene oxide layer; forming a stamper on the graphene oxide layer; removing the temporary substrate; and transferring the graphene oxide layer onto the first graphene layer and removing the stamper.

In at least one example embodiment, the graphene oxide layer may be formed by ultraviolet-treating the graphene layer formed on the temporary substrate.

According to another example embodiment, an energy storage device includes a first electrode, a separator, a second electrode, and an electrolyte that are sequentially stacked, wherein the first electrode and the second electrode include the above multi-layered graphene film.

In at least one example embodiment, the first electrode, the separator, and the second electrode may be provided between a cap and a can.

In at least one example embodiment, an elastic member may be provided between the second electrode and the cap.

In at least one example embodiment, a gasket may be provided between the cap and the can.

In at least one example embodiment, the first electrode and the second electrode may include a metal film together with the multi-layered graphene film, and the multi-layered graphene film of the first electrode and the multi-layered graphene film of the second electrode may face each other with the separator therebetween.

According to another example embodiment, a method of manufacturing an energy storage device includes: mounting a first electrode on a can; mounting a separator on the first electrode; mounting a second electrode on the separator; mounting a gasket contacting the can; mounting an elastic member on the second electrode; mounting a cap on the elastic member; and pressing the cap until the gasket and the cap are closely coupled with each other, wherein an electrolyte is injected into the electrode before the mounting of the elastic member, and the first electrode and the second electrode include the above multi-layered graphene film.

In at least one example embodiment, a desired (or, alternatively, predetermined) amount of the electrolyte may be dropped onto the first electrode before the separator is mounted on the first electrode.

In at least one example embodiment, a desired (or, alternatively, predetermined) amount of the electrolyte may be dropped onto the separator after the separator is mounted on the first electrode.

According to another example embodiment, a multi-layered graphene film has a structure in which two different graphene layers are repeatedly stacked alternately. One of the two graphene layers may be a single first graphene sheet, and the other one is a second graphene sheet including a plurality of graphene sheet fragments. Each of the plurality of graphene sheet fragments may have a smaller area than the first graphene sheet. Also, the total area of the plurality of graphene sheet fragments may be smaller than the area of the first graphene sheet. Each of the plurality of graphene sheet fragments is a fragment of a flat graphene sheet. Thus, each of the plurality of graphene sheet fragments may be regarded as a fragment of a flat graphene plate.

According to at least one example embodiment, in the multi-layered graphene film, the second graphene sheet may function as a spacer layer provided to secure a desired (or, alternatively, predetermined) space between first graphene sheets. Accordingly, the electrolyte may penetrate deep between the graphene layers of the multi-layered graphene film, and the contact area between the electrolyte and the graphene sheet may increase. Therefore, in the case of a supercapacitor using the multi-layered graphene film as an electrode, the capacitance of the supercapacitor may increase.

BRIEF DESCRIPTION OF THE DRAWINGS

These and/or other example embodiments will become apparent and more readily appreciated from the following description of the embodiments, taken in conjunction with the accompanying drawings in which.

DETAILED DESCRIPTION

Figure 1:
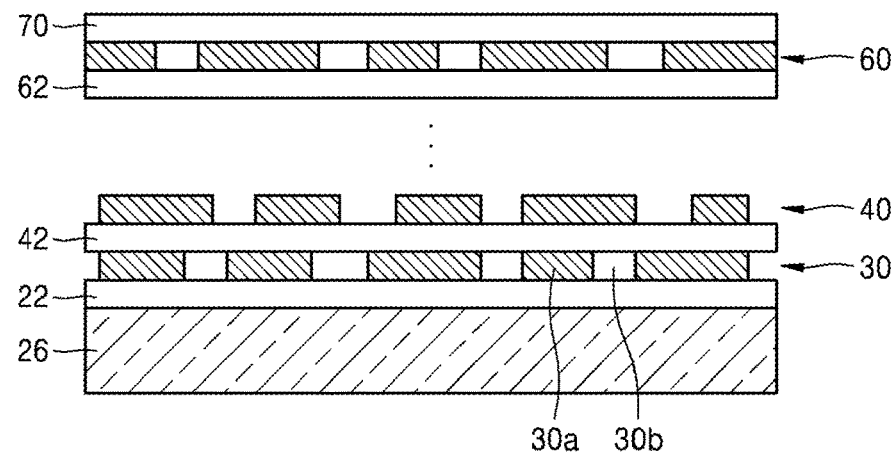
FIG. 1 is a cross-sectional view of a multi-layered graphene film according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain example embodiments of the present description.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

Hereinafter, multi-layered graphene films according to example embodiments, methods of manufacturing the multi-layered graphene fills, energy storage devices using the multi-layered graphene films as electrodes, and methods of manufacturing the energy storage devices will be described in detail with reference to the accompanying drawings. In the drawings, the thicknesses of layers and regions are exaggerated for clarity.

FIG. 1 is a cross-sectional view of a multi-layered graphene film according to an example embodiment.

Figure 9:
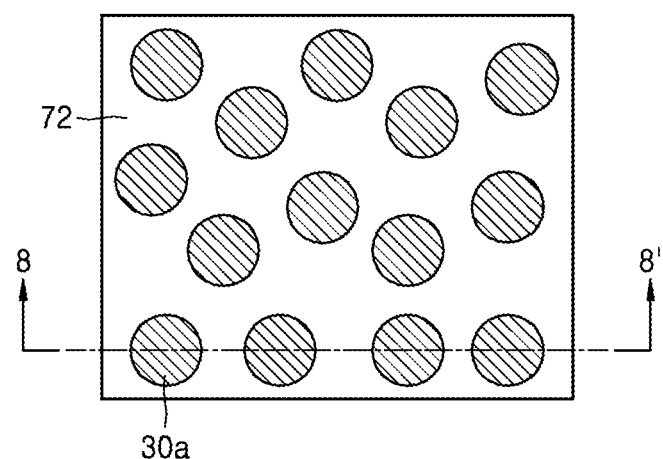

Referring to FIG. 1, a first graphene layer 22 is provided on a substrate 26. The substrate 26 may be a metal substrate. For example, the substrate 26 may be a copper (Cu) substrate, a nickel (Ni) substrate or another type of metal substrate. The substrate 26 may be a metal layer, such as a copper layer, a nickel layer, an aluminum (Al) layer, or another type of layer. The first graphene layer 22 may cover the entire top surface of the substrate 26 or a portion of the substrate 26. The first graphene layer 22 may be a single graphene sheet or more than one graphene sheet. According to an example embodiment, a second graphene layer 30 is provided on the first graphene layer 22. The second graphene layer 30 may include a plurality of graphene sheet fragments 30a. The graphene sheet fragment 30a may be a portion of a graphene sheet. Each of the plurality of graphene sheet fragments 30a has a smaller area than the graphene sheet of the first graphene layer 22. Also, the total area of the plurality of graphene sheet fragments 30a may be smaller than the area of the graphene sheet of the first graphene layer 22. For example, the plurality of graphene sheet fragments 30a may be spaced apart from each other, as illustrated in FIG. 9. Thus, a space 30b is present in-between the plurality of graphene sheet fragments 30a. According to an example embodiment, an electrolyte may flow in through the space 30b, and the electrolyte may penetrate into a deep region of the multi-layered graphene film through the space 30b. Thus, the contact area between the electrolyte and the multi-layered graphene film may increase. Therefore, when the multi-layered graphene film of FIG. 1 is used as an electrode of an energy storage device, the capacity of the energy storage device may increase.

According to an example embodiment, a third graphene layer 42 is provided on the second graphene layer 30. Like the first graphene layer 22, the third graphene layer 42 may be a single graphene sheet. A fourth graphene layer 40 may be provided on the third graphene layer 42. Like the second graphene layer 30, the fourth graphene layer 40 may include a plurality of graphene sheet fragments. An arrangement or distribution shape of the graphene sheet fragments included in the fourth graphene layer 40 may be the same or different from that of the second graphene layer 30. Fifth, sixth, and seventh graphene layers 62, 60, and 70 may also be sequentially stacked on the fourth graphene layer 40. The fifth and seventh graphene layers 62 and 70 may be similar to the first graphene layer 22. That is, the fifth and seventh graphene layers 62 and 70 may not include graphene sheet fragments and may be a single graphene sheet. Like the second and fourth graphene layers 30 and 40, the sixth graphene layer 60 may include a plurality of graphene sheet fragments. An arrangement shape of the graphene sheet fragments included in the sixth graphene layer 60 may be the same or different from that of the second graphene layer 30 or the fourth graphene layer 40. A plurality of graphene layers may be alternately stacked between the fourth graphene layer 40 and the fifth graphene layer 62. The seventh graphene layer 70 may be an upper graphene layer. In FIG. 1, the second, fourth, and sixth graphene layers 30, 40 and 60 may be used as spacer layers that maintain the distance between adjacent graphene layers at a desired (or, alternatively, predetermined) distance.

Figure 2:
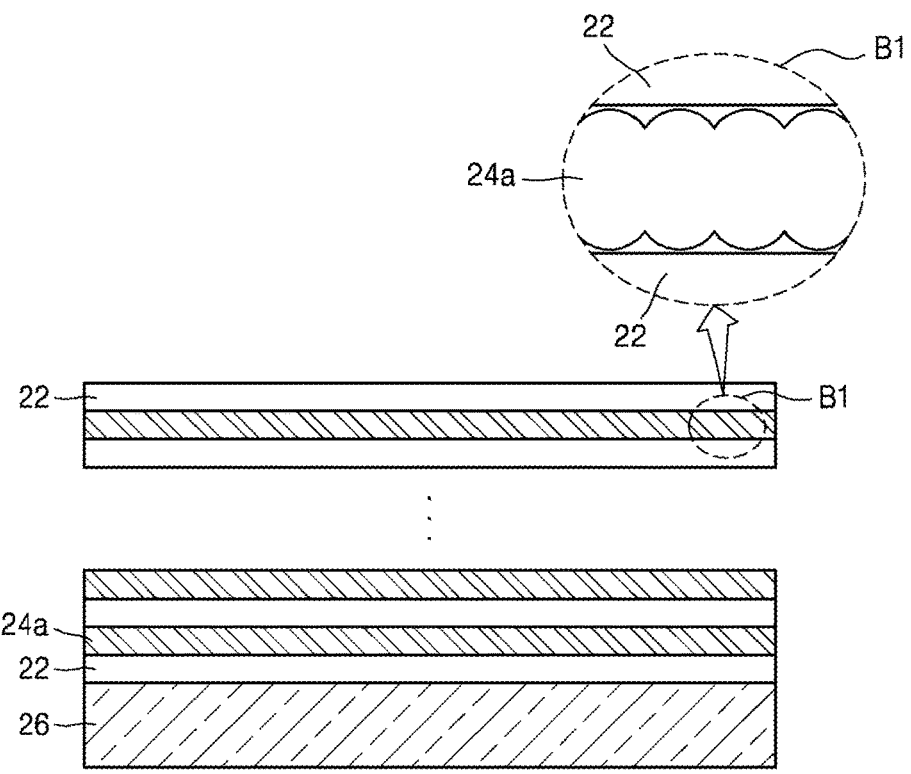
FIG. 2 is a cross-sectional view of a multi-layered graphene film according to another example embodiment.

FIG. 2 is a cross-sectional view of a multi-layered graphene film according to another example embodiment. In FIGS. 1 and 2, like reference numerals denote like elements.

Referring to FIG. 2, a first graphene layer 22 and a first graphene oxide layer 24a may be sequentially stacked on a substrate 26. According to an example embodiment, the first graphene layer 22 and the first graphene oxide layer 24a are stacked alternately two or more times on the substrate 26. The maximum number of alternate stacks may be, for example, 100, and may be more or less according to the characteristics of a product to which the multi-layered graphene film is applied. The uppermost layer of the multi-layered graphene film may be identical to, or similar to, or different than, the first graphene layer 22. Like the first graphene layer 22, the first graphene oxide layer 24a may be formed by forming a single graphene sheet and oxidizing the single graphene sheet.

According to an example embodiment, a surface of the first graphene oxide layer 24a contacting the first graphene layer 22 is uneven when viewed at an atomic level. Since the surface of the first graphene oxide layer 24a is uneven when viewed at an atomic level, the surface of the first graphene oxide layer 24a is represented as an embossed shape in an enlarged view of region B1 including a portion of the first graphene oxide layer 24a and a portion of each of the first graphene layers 22 provided on and under the first graphene oxide layer 24a. Since the surface of the first graphene oxide layer 24a is uneven when viewed at an atomic level, an electrolyte may flow in between the first graphene oxide layer 24a and the first graphene layer 22. Also, the first graphene oxide layer 24a may be used as a spacer layer such that the electrolyte may easily flow in through the space between the first graphene layers 22. The electrolyte flowing in between the first graphene oxide layer 24a and the first graphene layer 22 may penetrate along the first graphene layer 22 and, for example, may penetrate deep along the first graphene layer 22. Accordingly, since the contact area between the electrolyte and the first graphene layer 22 increases when the multi-layered graphene film of FIG. 2 is used as an electrode of an energy storage device, the capacity of the energy storage device may increase.

A method of manufacturing a multi-layered graphene film, according to an example embodiment, is described with reference to FIGS. 3 through 14.

Figure 3:
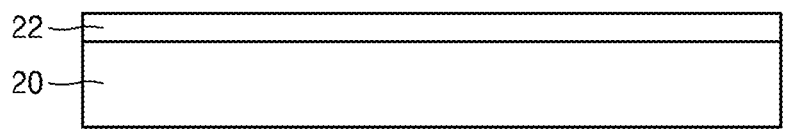
FIGS. 3 through 14 are cross-sectional views illustrating a method of manufacturing a multi-layered graphene film, according to an example embodiment.

Referring to FIG. 3, a first graphene layer 22 is formed on a first temporary substrate 20, according to at least one example embodiment. The first temporary substrate 20 may be a metal film. The metal film may be, for example, a copper film or a nickel film, but is not limited thereto. The metal film may be any metal film as long as a graphene layer may be grown thereon. The first graphene layer 22 may be a single graphene sheet, and may cover a portion of, or the entire top surface of, the first temporary substrate 20. The first graphene layer 22 may be grown by thermal chemical vapor deposition (TCVD). The first graphene layer 22 may also be grown by any other method, such as inductively coupled plasma CVD (ICP CVD).

Figure 4:
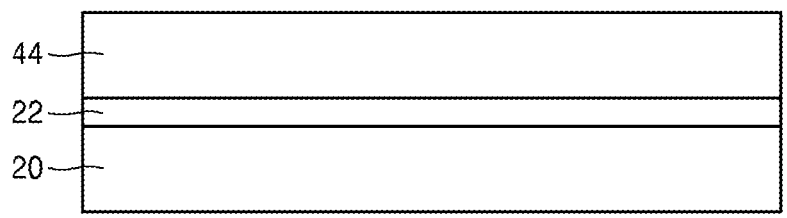
Figure 5:
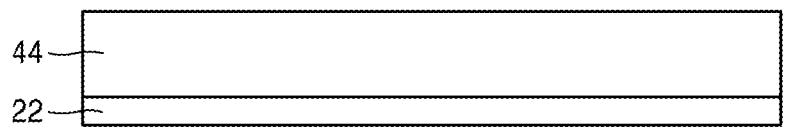

Referring to FIG. 4, a first stamper 44 is formed on the first graphene layer 22, according to at least one example embodiment. For example, the first stamper 44 may be formed by depositing PMMA (polymethyl methacrylate) or PDMS (polydimethylsiloxane) on the first graphene layer 22. After forming the first stamper 44, the first temporary substrate 20 may be removed by using a metal etchant. Consequently, only the first graphene layer 22 and the first stamper 44 are left as illustrated in FIG. 5.

Figure 6:
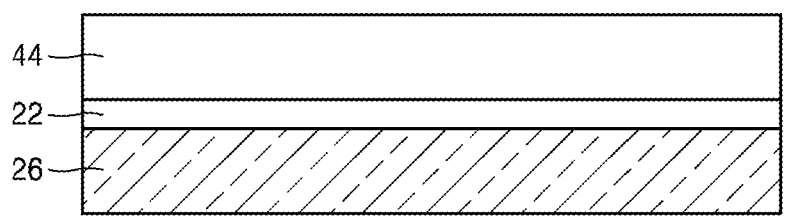
Figure 7:
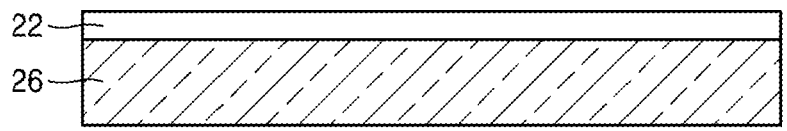

Referring to FIG. 6, the first graphene layer 22 and the first stamper 44, which are left after removal of the first temporary substrate 20, are attached on a substrate 26, according to at least one example embodiment. In this regard, the first graphene layer 22 is attached to the substrate 26. Thereafter, the first stamper 44 may be removed from the resulting structure of FIG. 6. In this way, the first graphene layer 22 may be transferred onto the substrate 26 as illustrated in FIG. 7. The first stamper 44 may be removed by using a suitable etchant based on the material used as the first stamper 44. For example, when the first stamper 44 is formed of PMMA, the first stamper 44 may be removed by using acetone.

Figure 8:
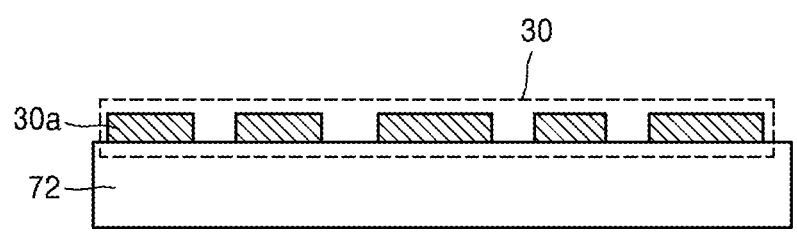

Referring to FIG. 8, a second graphene layer 30 is formed on a second temporary substrate 72, according to at least one example embodiment. The second temporary substrate 72 may be identical to the first temporary substrate 20, or may be a substrate that is formed of a different metal material than the first temporary substrate 20. The second graphene layer 30 may or may not cover the entire top surface of the second temporary substrate 72. The second graphene layer 30 includes a plurality of graphene sheet fragments 30a. The plurality of graphene sheet fragments 30a may be a plurality of graphene sheet fragments that are distributed evenly on the top surface of the second temporary substrate 72, or distributed unevenly. The plurality of graphene sheet fragments 30a may be spaced apart from each other. Thus, the total area of the plurality of graphene sheet fragments 30a may be smaller than the area of the first graphene layer 22.

FIG. 9 illustrates an example of the distribution of the plurality of graphene sheet fragments 30a, according to at least one example embodiment. For convenience, the graphene sheet fragments 30a are illustrated in the same shape in FIG. 9; however, some of the graphene sheet fragments 30a may have a different shape than the other graphene sheet fragments 30a. FIG. 8 is a cross-sectional view taken along line 8-8' of FIG. 9. The second graphene layer 30 may be grown by TCVD (thermal chemical vapor deposition). For example, the second graphene layer 30 may be formed by flowing gases such as, for example, $H_2$ and $CH_4$, on copper foil for a period of time such as, for example, about 20 minutes at a temperature higher than ambient temperature such as, for example, about 1000° C. and at a flow of about 20 sccm (standard cubic centimeters per minute) and about 5 sccm, respectively. In this case, a plurality of graphene sheet fragments 30a may be formed by adjusting a graphene growth time thereof to be shorter than a graphene growth time of the first graphene layer 22. According to an example embodiment, when ICP CVD (inductively coupled plasma chemical vapor deposition) is used, the second graphene layer 30 may be deposited by generating argon (Ar) plasma while supplying Ar and $CH_4$ into a chamber. In this case, the supply amounts of Ar and $CH_4$ may be, for example, about 5 sccm.

Figure 10:
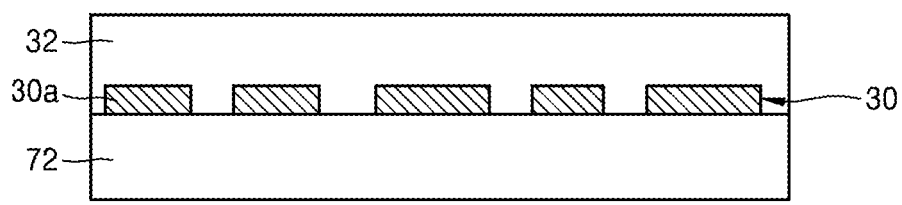
Figure 11:

Referring to FIG. 10, a second stamper 32 is formed to cover the second graphene layer 30, according to at least one example embodiment. The second stamper 32 may fill the space between the graphene sheet fragments 30a. The second stamper 32 may be identical to the first stamper 44 of FIG. 4. Thereafter, the second temporary substrate 72 may be removed from the resulting structure of FIG. 10. Consequently, only the second graphene layer 30 and the second stamper 32 are left as illustrated in FIG. 11. The second temporary substrate 72 may be removed in the same manner as the first temporary substrate 20 described with reference to FIG. 4.

Figure 12:
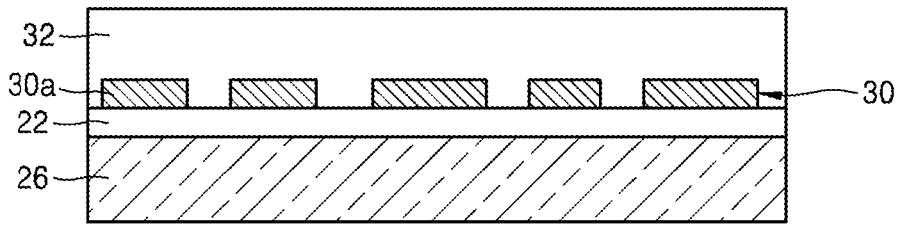
Figure 13:
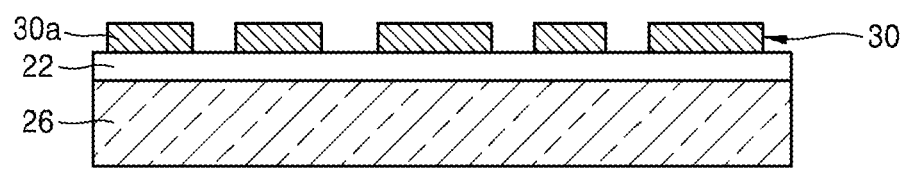

Referring to FIG. 12, the resulting structure of FIG. 11 is attached on the substrate 26, to which the first graphene layer 22 is transferred, such that the first and second graphene layers 22 and 30 are attached, according to at least one example embodiment. Thereafter, the second stamper 32 is removed. Consequently, as illustrated in FIG. 13, the second graphene layer 30 is transferred onto the first graphene layer 22, to form a multi-layered graphene film in which the first and second graphene layers 22 and 30 are sequentially stacked on the substrate 26.

Figure 14:
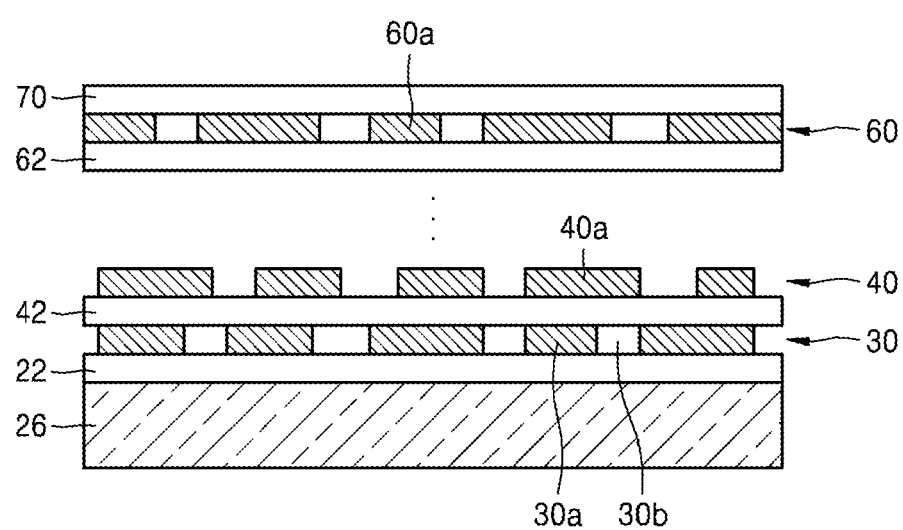

Thereafter, referring to FIG. 14, third through seventh graphene layers 42, 40, 62, 60, and 70 are sequentially formed on the second graphene layer 30, according to at least one example embodiment. The third, fifth and seventh graphene layers 42, 62 and 70 may be formed in the same manner as the first graphene layer 22. The fourth and sixth graphene layers 40 and 60 may be formed in the same manner as the second graphene layer 30. An arrangement or distribution pattern of graphene sheet fragments 40a included in the fourth graphene layer 40 may be different from that of graphene sheet fragments 60a included in the sixth graphene layer 60. Like the first and second graphene layers 22 and 30, a plurality of graphene layers may be alternately stacked between the fourth graphene layer 40 and the fifth graphene layer 62. Accordingly, a multi-layered graphene film, in which a graphene layer including a single graphene sheet and a graphene layer including a plurality of graphene sheet fragments are alternately stacked on the substrate 26, is formed. Herein, the uppermost layer of the multi-layered graphene film is a graphene layer such as graphene layer 70 including a single graphene sheet. In FIG. 14, the number of alternate stacks of graphene layers may be 2 or more, and the maximum number of alternate stacks of graphene layers may be about 100. In some cases, the number of alternate stacks of graphene layers may be 100 or more or 100 or less. As illustrated in FIG. 14, after the multi-layered graphene film is formed, the resulting structure thereof may be heat-treated. The interlayer adhesion may be improved by this heat treatment.

A method of manufacturing a multi-layered graphene film, according to another example embodiment, is described with reference to FIGS. 15 through 21.

According to at least one example embodiment, a first graphene layer 22 is formed on a substrate 26 according to the process illustrated in FIGS. 3 through 7.

Figure 15:
FIGS. 15 through 21 are cross-sectional views illustrating a method of manufacturing a multi-layered graphene film, according to another example embodiment.
Figure 16:
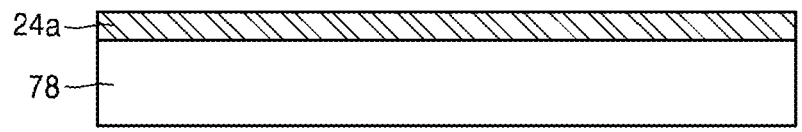

Thereafter, as illustrated in FIG. 15, an additional graphene layer (eighth graphene layer in the above example) 24 is formed on an additional temporary substrate (a third temporary substrate in the example above) 78, according to at least one example embodiment. The third temporary substrate 78 may be a metal substrate, such as a copper substrate, a nickel substrate or another metal substrate. For example, the eighth graphene layer 24 may be grown by TCVD. The eighth graphene layer 24 may be oxidized by ultraviolet treatment. As a result, as illustrated in FIG. 16, a first graphene oxide layer 24a is formed on the third temporary substrate 78.

Figure 17:
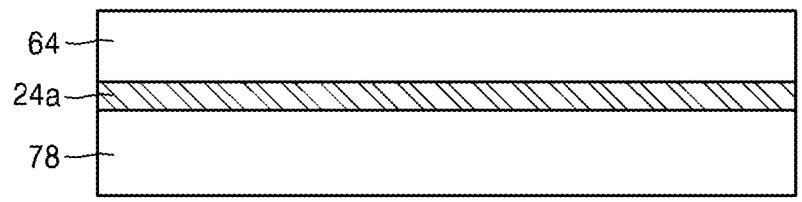

Thereafter, referring to FIG. 17, an additional stamper (a third stamper in the example above) 64 is formed on the first graphene oxide layer 24a, according to at least one example embodiment. For example, the third stamper 64 may be formed by spin-coating PMMA on the first graphene oxide layer 24a. Thereafter, the third temporary substrate 78 may be removed from the resulting structure of FIG. 17. Accordingly, only the first graphene oxide layer 24a and the third stamper 64 are left as illustrated in FIG. 18.

Figure 18:
Figure 19:
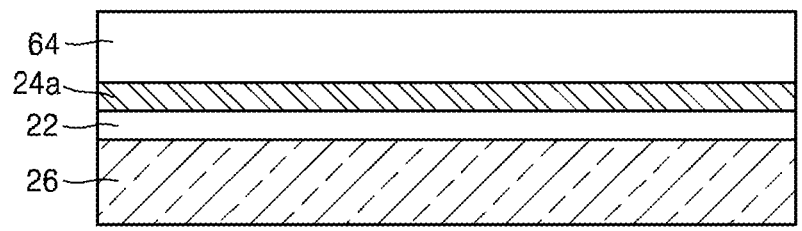
Figure 20:
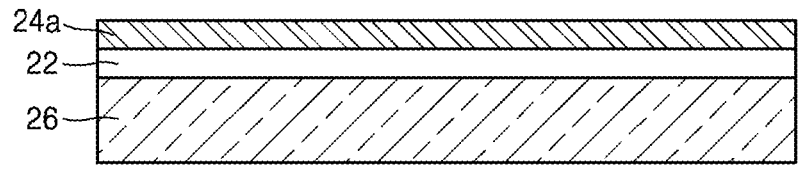

Thereafter, as illustrated in FIG. 19, the resulting structure of FIG. 18 is attached on the substrate 26 such that the first graphene oxide layer 24a is attached on the first graphene layer 22, according to at least one example embodiment. The third stamper 64 may be removed from the resulting structure of FIG. 19. Consequently, as illustrated in FIG. 20, the first graphene oxide layer 24a is transferred onto the first graphene layer 22, to form a multi-layered graphene film including the first graphene layer 22 and the first graphene oxide layer 24a on the substrate 26.

Figure 21:
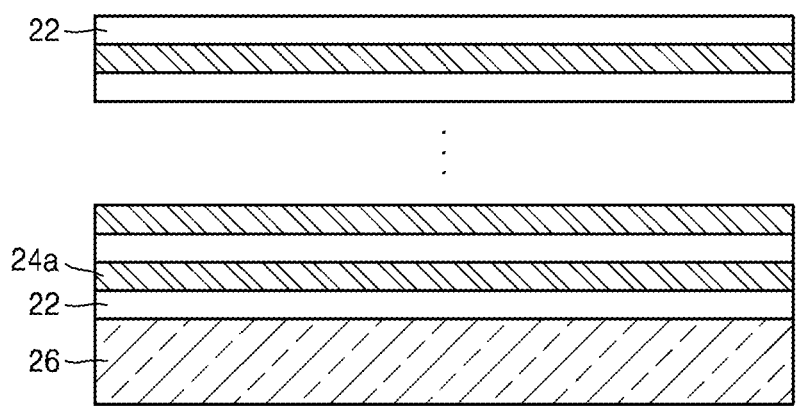

As illustrated in FIG. 21, the first graphene layer 22 and the first graphene oxide layer 24a may be repeatedly stacked alternatively on the first graphene oxide layer 24a, according to at least one example embodiment. The first graphene layer 22 may be formed as the uppermost layer. The number of alternating stacks of the first graphene layer 22 and the first graphene oxide layer 24a on the substrate 26 may be 2 or more.

Figure 22:
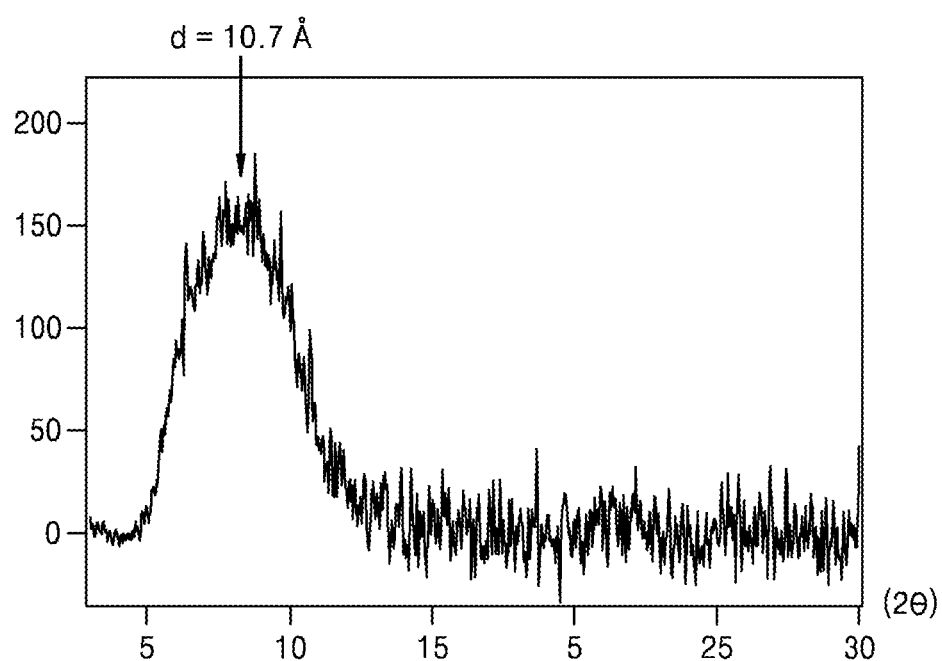
FIG. 22 is a graph illustrating an X-ray diffraction result of a multi-layered graphene film according to an example embodiment.

FIG. 22 illustrates X-ray diffraction characteristics obtained by measuring the distance between graphene layers constituting one graphene sheet in a multi-layered graphene film according to an example embodiment. The distance between the graphene layers may be, for example, the distance between the first and third graphene layers 22 and 42 in the multi-layered graphene film of FIG. 14, or the distance between the fifth graphene layer 62 and the uppermost graphene layer 70. Also, the distance between the graphene layers may be the distance between the adjacent first graphene layers 22 in the multi-layered graphene film of FIG. 21.

Referring to FIG. 22, a peak occurs between diffraction angles 5-10 (2θ). The peak corresponds to the case where the distance between the graphene layers is about 10.7 Å, according to at least one example embodiment.

It may be seen from FIG. 22 that the distance between graphene layers constituting one graphene sheet in a multi-layered graphene film according to an example embodiment is greater than the minimum thickness (e.g., 6 Å) at which the electrolyte may penetrate. Thus, the electrolyte may penetrate deep into the graphene sheet and thus contact most or the entire graphene sheet. Accordingly, the contact area between the graphene sheet and the electrolyte increases, thus increasing the contact area between the electrode and the electrolyte. As such, according to at least one example embodiment, as the contact area between the electrode and the electrolyte increases, the capacity of an energy storage device (e.g., a supercapacitor) using the multi-layered graphene film as the electrode increases. For example, FIG. 2 illustrates such an energy storage device.

An energy storage device according to an example embodiment will be described with reference to FIGS. 23 through 27. The energy storage device may be a supercapacitor.

Figure 23:
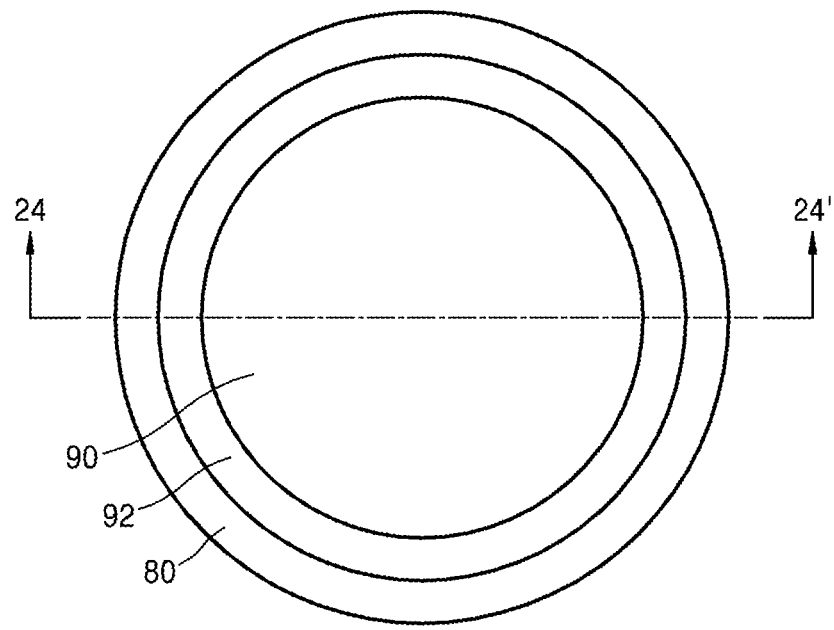
FIG. 23 is a plan view of an energy storage device according to an example embodiment.

FIG. 23 is a plan view of an energy storage device according to an example embodiment.

According to at least one example embodiment, in FIG. 23, a reference numeral "90" denotes a cap. The illustrated cap 90 is circular, but may have a shape different from a circular shape. A gasket 92 is provided around the cap 90. The cap 90 and the gasket 92 contact each other. The gasket 92 is surrounded by a can 80. The gasket 92 and the can 80 contact each other.

Figure 24:
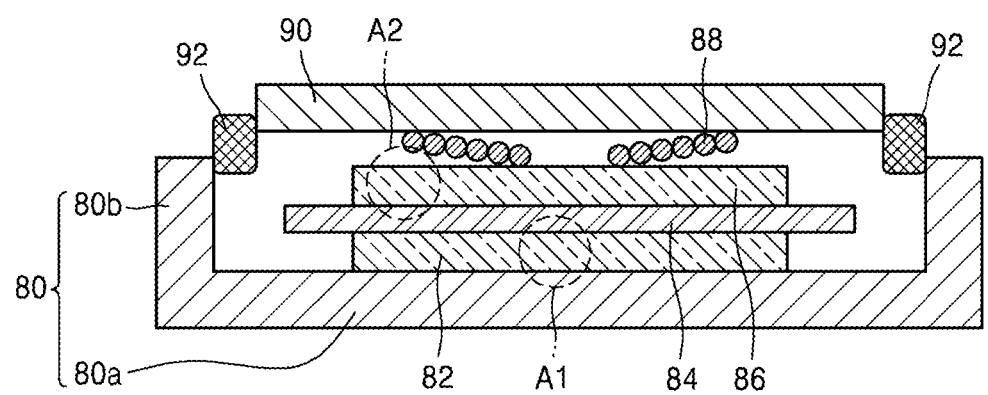
FIG. 24 is a cross-sectional view taken along line 24-24' of FIG. 23.

FIG. 24 is a cross-sectional view taken along line 24-24' of FIG. 23.

Referring to FIG. 24, the can 80 is provided at a bottom portion, according to at least one example embodiment. The can 80 includes a horizontal portion 80a and a vertical portion 80b. The vertical portion 80b is connected to both ends of the horizontal portion 80a. The vertical portion 80b extends upward from the horizontal portion 80a. Thus, the vertical portion 80b may be regarded as continuing from the horizontal portion 80a. The vertical portion 80b may be shorter than the horizontal portion 80a. A first electrode 82, a separator 84, and a second electrode 86 may be sequentially stacked on the horizontal portion 80a of the can 80. The separator 84 is an insulator and prevents contact between the first and second electrodes 82 and 86. According to at least one example embodiment, the bottom surface of the separator 84 may be wider than the top surface of the first electrode 82, and the top surface of the separator 84 may be wider than the bottom surface of the second electrode 86. The dimensions of the first and second electrodes 82 and 86 may be equal to, or different from, each other. The first electrode 82 may be an electrode including the multi-layered graphene film illustrated in FIG. 1 or 2. The second electrode 86 may be an electrode including the multi-layered graphene film illustrated in FIG. 1 or 2. The multi-layered graphene film included in the first and second electrodes 82 and 86 may include an electrolyte that may be uniformly distributed throughout the multi-layered graphene film.

According to at least one example embodiment, the cap 90 is provided on the second electrode 86. The cap 90 may cover the first and second electrodes 82 and 86 and the separator 84. A conductive elastic member 88 may be provided between the cap 90 and the second electrode 86. The conductive elastic member 88 may be, for example, a spring. The conductive elastic member 88 contacts the cap 90 and the second electrode 86. An edge of the cap 90 is adjacent to a top end of the vertical portion 80b of the can 80. The gasket 92 is provided between the edge of the cap 90 and the vertical portion 80b of the can 80. The gasket 92 contacts the cap 90 and the vertical portion 80b of the can 80. The gasket 92 prevents the leakage of the electrolyte, and provides a close connection between the cap 90 and the can 80. The gasket 92 may be formed of a transparent material, for example, flexible plastic.

In FIG. 24, the cap 90 is illustrated as a flat plate. However, the example embodiment is not limited thereto, and a center portion of the cap 90 may be convexly curved upward.

Figure 25:
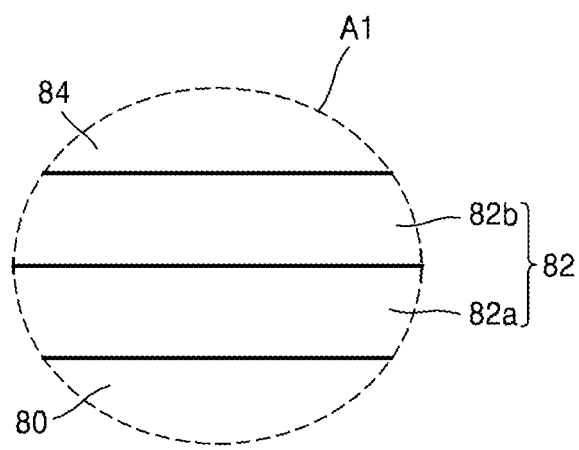
FIG. 25 is an enlarged cross-sectional view of a first area A1 including a portion of a first electrode of FIG. 24.

FIG. 25 is an enlarged view of a first area A1 including a portion of the first electrode 82 and of the separator 84 of FIG. 24.

Referring to FIG. 25, the first electrode 82 may include a first metal film 82a and a first graphene film 82b that are sequentially stacked. The first metal film 82a contacts the can 80. The first metal film 82a may be, for example, a copper film. The first graphene film 82b may be the multi-layered graphene film illustrated in FIG. 1 or 2.

Figure 26:
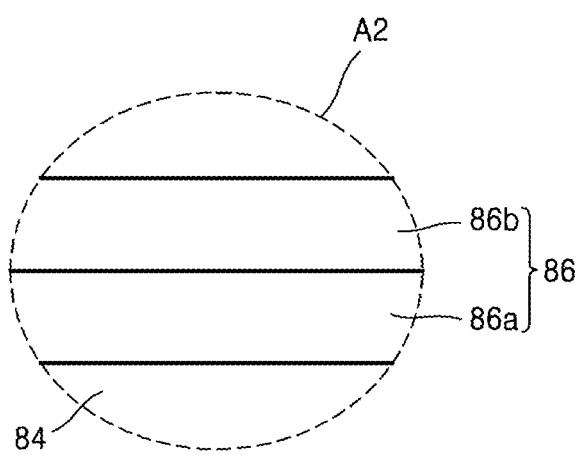
FIG. 26 is an enlarged cross-sectional view of a second area A2 including a portion of a second electrode of FIG. 24.

FIG. 26 is an enlarged view of a second area A2 including a portion of the second electrode 86 and of the separator 84 of FIG. 24.

Referring to FIG. 26, the second electrode 86 may include a second graphene film 86a and a second metal film 86b that are sequentially stacked, according to at least one example embodiment. The second graphene film 86a is formed on the separator 84, and may be the multi-layered graphene film illustrated in FIG. 1 or 2. The second metal film 86b may be, for example, a copper film or other metal film. The first and second metal films 82a and 86b may be the same metal films or different metal films.

Figure 27:
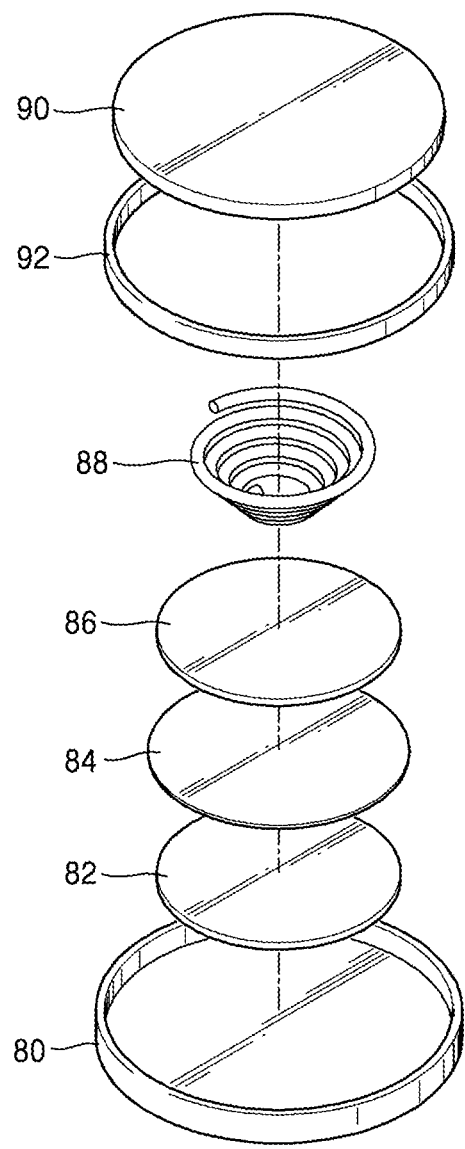
FIG. 27 is an exploded perspective view of the energy storage device of FIG. 24.

FIG. 27 is an exploded perspective view of the energy storage device of FIG. 24.

Referring to FIG. 27, the external shapes of respective components of the energy storage device are circular, and the gasket 92 is ring-shaped, according to at least one example embodiment.

A method of manufacturing an energy storage device, according to an example embodiment, is described with reference to FIGS. 28 through 34. In FIGS. 24 through 27 and FIGS. 28 through 34, like reference numerals denote like elements, and a description thereof is omitted herein.

Figure 28:
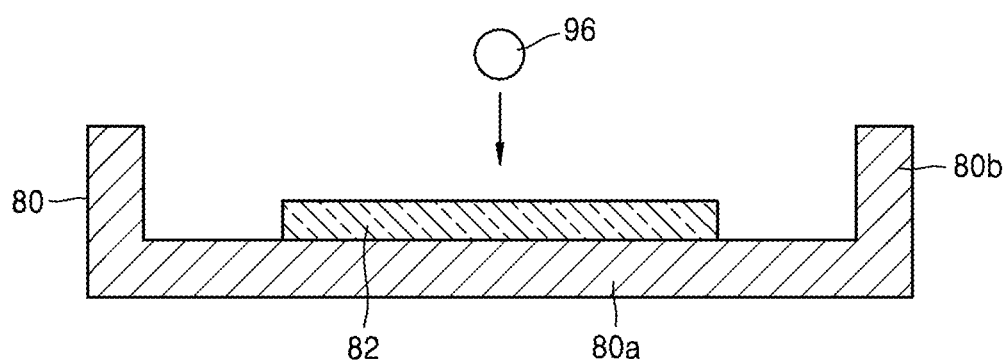
FIGS. 28 through 34 are cross-sectional views illustrating a method of manufacturing an energy storage device, according to an example embodiment.

Referring to FIG. 28, a first electrode 82 is mounted on a horizontal portion 80a of a can 80, according to at least one example embodiment. The first electrode 82 may have a structure in which a copper film or other metal film and the multi-layered graphene film of FIG. 1 or 2 are sequentially stacked. The first electrode 82 may include a metal film, such as a copper film or other metal film, thereby reducing the contact resistance between the first electrode 82 and the can 80. After the first electrode 82 is mounted, a desired (or, alternatively, predetermined) amount of an electrolyte 96 is dropped onto the first electrode 82.

Figure 29:
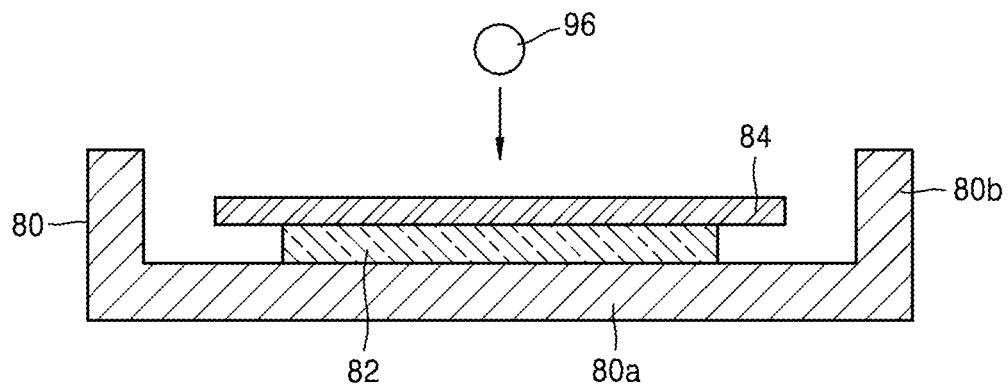

According to at least one example embodiment, as illustrated in FIG. 29, once the electrolyte 96 is provided onto the first electrode 82 as discussed above, a separator 84 is provided on the first electrode 82. After the separator 84 is mounted, a desired (or, alternatively, predetermined) amount of the electrolyte 96 is provided onto the separator 84. The electrolyte 96 provided onto the first electrode 82 may or may not be the same as the electrolyte 96 provided onto the separator 84.

Figure 30:
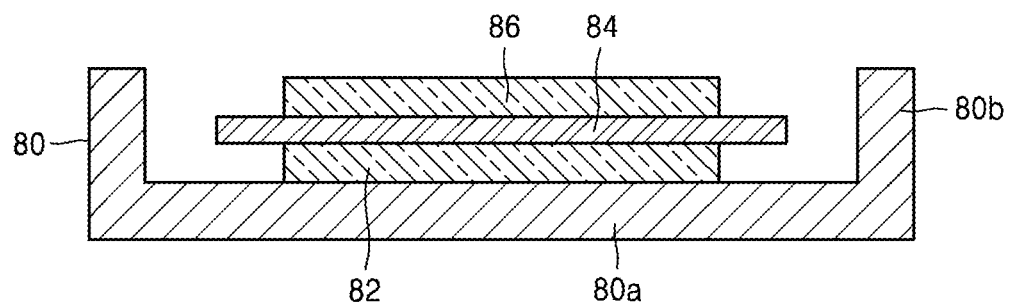

Thereafter, as illustrated in FIG. 30, a second electrode 86 is mounted on the separator 84, according to at least one example embodiment. The second electrode 86 may have a structure in which the multi-layered graphene film of FIG. 1 or 2 and a copper film are sequentially stacked. After the second electrode 86 is mounted, the electrolyte 96 may also be dropped onto the second electrode 86.

Figure 31:
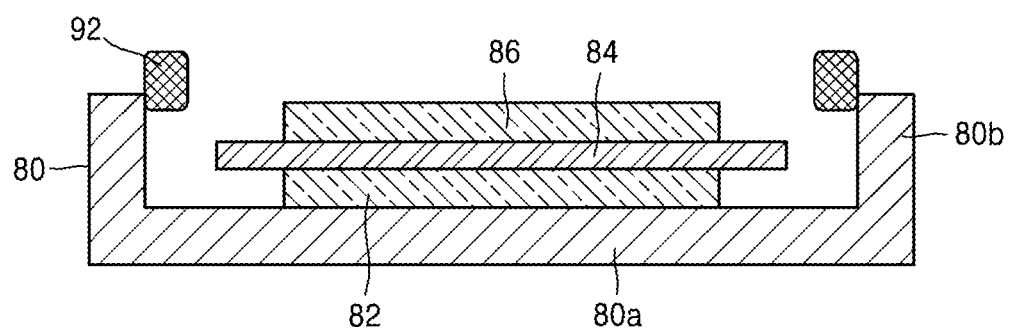
Figure 32:
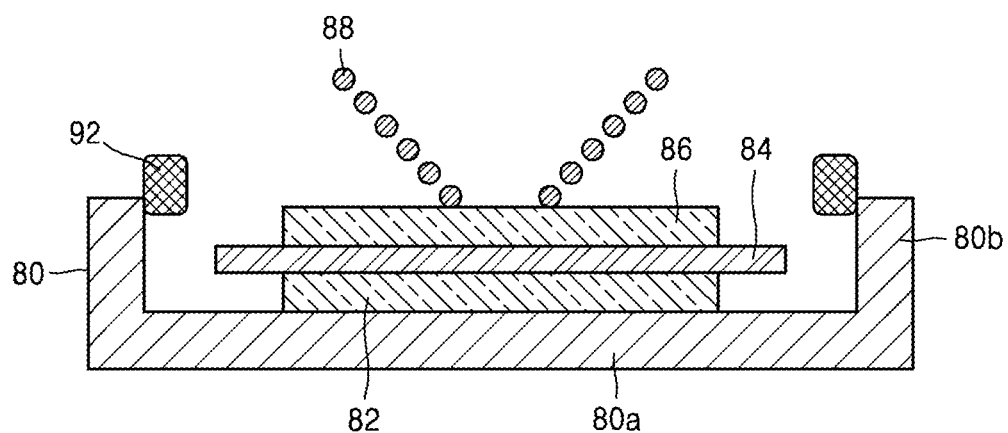

Thereafter, as illustrated in FIG. 31, a ring-shaped gasket 92 is disposed inside a vertical portion 80b of the can 80, according to at least one example embodiment. A portion of the gasket 92 contacts an inner surface of the vertical portion 80b. The gasket 92 may be disposed before or after the second electrode 86 is mounted. Thereafter, as illustrated in FIG. 32, a conductive elastic member 88 is disposed on the second electrode 86, according to at least one example embodiment.

Figure 33:
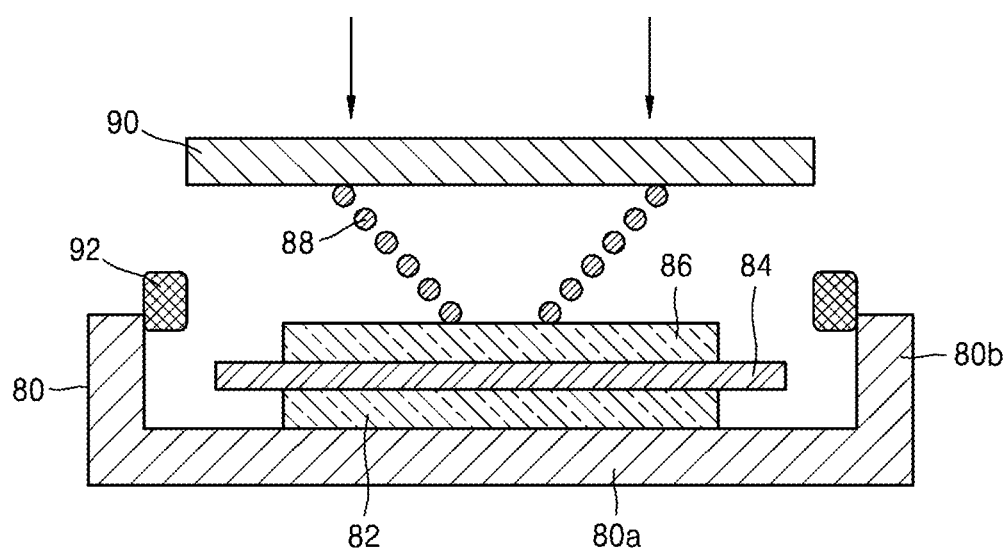

Thereafter, as illustrated in FIG. 33, a cap 90 is disposed on the conductive elastic member 88, and the cap 90 is gradually pressed in a downward direction via the application of a downward pressure, according to at least one example embodiment.

Figure 34:
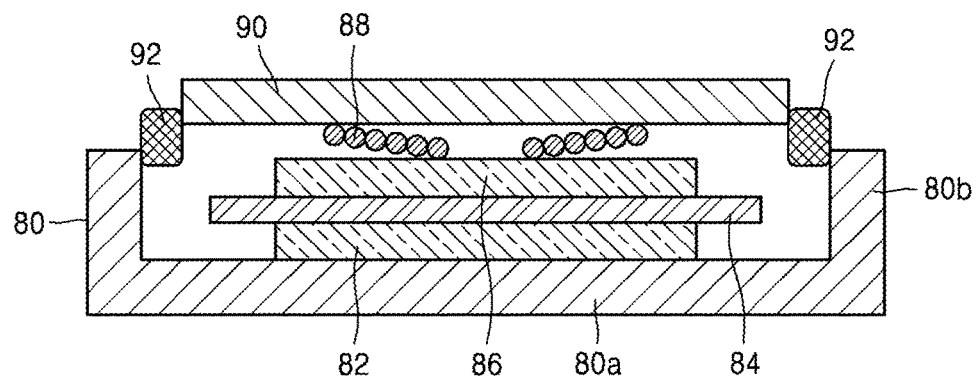

As illustrated in FIG. 34, the downward pressure may be maintained until the cap 90 contacts the gasket 92, and the downward pressure may be maintained for a desired (or, alternatively, predetermined) time after the cap 90 contacts the gasket 92, according to at least one example embodiment. The downward pressure may be applied at a desired (or, alternatively, predetermined) pressure until the cap 90 is no longer pressed. As a result of the downward pressure, the cap 90 is inserted into the gasket 92, and thus, the can 80 and the cap 90 may closely contact each other with the gasket 92 therebetween. As a result of the downward pressure, the first electrode 82, the separator 84, and the second electrode 86 are pressed, and the electrolyte 96 supplied to the first electrode 82 and to the separator 84 may be uniformly distributed throughout the first and second electrodes 82 and 86.

Figure 35:
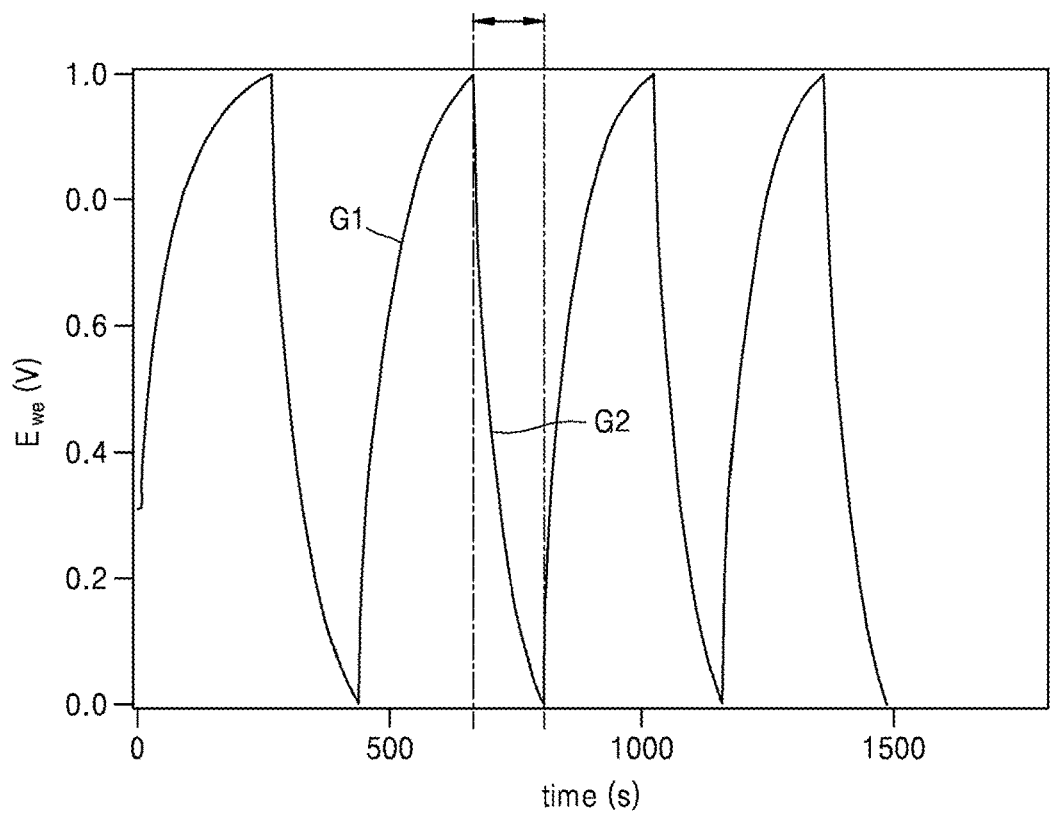
FIG. 35 is a graph illustrating a test result of the capacity characteristics of an energy storage device manufactured by the method of FIGS. 28 through 34.

FIG. 35 is a graph illustrating a test result of the capacity characteristics of the energy storage device manufactured by the manufacturing method of FIGS. 28 through 34, according to at least one example embodiment.

The result of FIG. 35 is obtained in the following manner:

In detail, a voltage of the energy storage device is measured while charging the energy storage device by applying a current to the energy storage device. When the measured voltage is Ewe=1.0 V, the charging is stopped. After completion of the charging, the energy storage device is discharged by applying a current with an opposite polarity to the polarity for the charging. The discharging is performed until Ewe=0 V. After Ewe=0 V, the charging and discharging are repeated. A current corresponding to about 1 A/g (amp per gram) is applied for the charging, and a current corresponding to about 1 A/g is discharged for the discharging. Herein, gram (g) represents 1 gram multi-layered graphene film included in the first and second electrodes 82 and 86.

In FIG. 35, a horizontal axis represents a charge time and a discharge time of the energy storage device. A vertical axis represents a charge voltage of the energy storage device and a discharge voltage of the energy storage device.

In FIG. 35, a first graph G1 represents a voltage-time change of the energy storage device in charging, and a second graph G2 represents a voltage-time change of the energy storage device in discharging.

Referring to the second graph G2, it takes about 150 seconds (s) until the energy storage device is completely discharged (Ewe=0.0 V) after the energy storage device is completely charged (Ewe=1.0 V). In the case of a related art energy storage device, which uses an electrode in the form of a cohered graphene oxide without using the multi-layered graphene film according to an example embodiment, the time taken to complete discharging (1 A/g reference) is about 50 seconds. Therefore, the time taken to complete discharging of the energy storage device according to the example embodiment is much longer than the time taken to complete discharging of the related art energy storage device.

This result indicates that the energy storage capacity of the energy storage device according to the example embodiment is much larger than the energy storage capacity of the related art energy storage device. Also, this result is caused by a difference in electrode configuration, and indicates that the electrode configuration according to the example embodiment is more efficient than the related art electrode configuration, in increasing the energy storage capacity.

Also, in FIG. 35, the first and second graphs G1 and G2 are repeated in the same pattern, which indicates that the charge and discharge characteristics are repeated in the same manner. Thus, FIG. 35 indicates that the energy storage device used to obtain the result of FIG. 35 has reliability in the charge and discharge characteristics.

The capacity of the energy storage device having the time-voltage characteristics of FIG. 35 may be calculated as follows:

In detail, the per-gram capacity ($C_1$) of the graphene film included in one of the two electrodes, namely, the first and second electrode 82 and 86, of the energy storage device is $C_1=1/(1/171.63)$ F/g=171.63 F/g. The capacity ($C_2$) of the two electrodes, namely, the first and second electrode 82 and 86, is twice the capacity of the one electrode. That is, $C_2=2\times C_1=343.26$ F/g. When this value is represented in a value of capacity per unit volume, $C_2=343.26$ F/g$\times 2.2\times 3.4/10$ g/cm$^3$=256.76 F/cm$^3$.

It should be understood that the exemplary embodiments described therein should be considered in a descriptive sense only and not for purposes of limitation. Descriptions of features or examples within each embodiment should typically be considered as available for other similar features or examples in other embodiments.

While one or more example embodiments have been described with reference to the figures, it will be understood by those of ordinary skill in the art that various changes in form and details may be made therein without departing from the spirit and scope of example embodiments as defined by the following claims.

What is claimed is:

1. A method of manufacturing a multi-layered graphene film, the method comprising:
   forming a first graphene layer on a substrate;
   forming a spacer layer on the first graphene layer; and
   forming an upper graphene layer on the spacer layer,
   wherein the spacer layer maintains a desired distance between the first graphene layer and the upper graphene layer; and
   wherein the spacer layer comprises a plurality of graphene sheet fragments and the plurality of graphene sheet fragments are formed by adjusting a graphene growth time of the plurality of graphene sheet fragments to be shorter than a graphene growth time of the first graphene layer.

2. The method of claim 1, wherein a plurality of layers with different layer configurations are further formed between the spacer layer and the upper graphene layer.

3. The method of claim 2, wherein the plurality of layers with different layer configurations comprises one or more combinations of an additional graphene layer and an additional spacer layer stacked on the spacer layer.

4. The method of claim 1, wherein
   the spacer layer comprises a second graphene layer, and
   the second graphene layer has a different layer configuration than the first graphene layer and the upper graphene layer.

5. The method of claim 4, wherein
   the second graphene layer comprises a plurality of graphene sheet fragments that are spaced apart from each other in a planar direction of the second graphene layer, and the first graphene layer comprises at least one graphene sheet that has a larger surface area than a total surface area of the plurality of graphene sheet fragments.

6. The method of claim 1, wherein the forming of the first graphene layer on the substrate comprises:
forming a first graphene sheet on a first temporary substrate;
attaching a first stamper to the first graphene sheet;
removing the first temporary substrate;
attaching the first graphene sheet, to which the first stamper is attached, on the substrate; and
removing the first stamper.

7. The method of claim 1, wherein the forming of the spacer layer on the first graphene layer comprises:
forming a plurality of graphene sheet fragments on a second temporary substrate;
attaching a second stamper to the plurality of graphene sheet fragments;
removing the second temporary substrate;
attaching the plurality of graphene sheet fragments, to which the second stamper is attached, to the first graphene layer; and
removing the second stamper.

8. The method of claim 7, wherein the plurality of graphene sheet fragments are formed with a shorter graphene growth time than the first graphene layer.

9. The method of claim 6, wherein the first temporary substrate is a metal substrate.

10. The method of claim 7, wherein the second temporary substrate is a metal substrate.

11. The method of claim 1, wherein the forming of the spacer layer on the first graphene layer comprises:
forming a graphene layer on a temporary substrate;
changing the graphene layer, formed on the temporary substrate, into a graphene oxide layer;
forming a stamper on the graphene oxide layer;
removing the temporary substrate; and
transferring the graphene oxide layer onto the first graphene layer and removing the stamper.

12. The method of claim 11, wherein the graphene oxide layer is formed by ultraviolet-treating the graphene layer formed on the temporary substrate.

13. The method of claim 3, wherein
the spacer layer comprises a second graphene layer, and
the second graphene layer has a different layer configuration than the first graphene layer and the upper graphene layer.

14. The method of claim 3, wherein the spacer layer is a graphene oxide layer.

15. A method of manufacturing an energy storage device, the method comprising:
mounting a first electrode on a can;
mounting a separator on the first electrode;
mounting a second electrode on the separator;
mounting a gasket contacting the can;
mounting an elastic member on the second electrode;
mounting a cap on the elastic member; and
pressing the cap until the gasket and the cap are closely coupled with each other,
wherein
an electrolyte is injected into the electrode before the mounting of the elastic member, and
the first electrode and the second electrode are formed by the method of claim 1.

16. The method of claim 15, wherein a desired amount of the electrolyte is dropped onto the first electrode before the separator is mounted on the first electrode.

17. The method of claim 16, wherein a desired amount of the electrolyte is dropped onto the separator after the separator is mounted on the first electrode.

* * * * *